(12) United States Patent
Houda et al.

(10) Patent No.: US 11,348,735 B2
(45) Date of Patent: May 31, 2022

(54) HIGH VOLTAGE FILTER AND POWER CONVERSION DEVICE

(71) Applicant: Hitachi Automotive Systems, Ltd., Hitachinaka (JP)

(72) Inventors: Isao Houda, Tokyo (JP); Aya Ohmae, Tokyo (JP); Hiroki Funato, Tokyo (JP); Yusaku Katsube, Hitachinaka (JP); Ayumu Hatanaka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/267,585

(22) PCT Filed: Jul. 10, 2019

(86) PCT No.: PCT/JP2019/027356
§ 371 (c)(1),
(2) Date: Feb. 10, 2021

(87) PCT Pub. No.: WO2020/066222
PCT Pub. Date: Apr. 2, 2020

(65) Prior Publication Data
US 2021/0319956 A1 Oct. 14, 2021

(30) Foreign Application Priority Data
Sep. 25, 2018 (JP) .............................. JP2018-179490

(51) Int. Cl.
*H01G 4/38* (2006.01)
*H01G 4/228* (2006.01)
(Continued)

(52) U.S. Cl.
CPC .............. *H01G 4/38* (2013.01); *H01G 4/228* (2013.01); *H02M 1/14* (2013.01); *H02M 1/44* (2013.01); *H02M 7/003* (2013.01); *H02M 7/48* (2013.01)

(58) Field of Classification Search
CPC ......... H01G 4/38; H01G 4/228; H02M 7/003; H02M 1/14; H02M 1/44; H02M 7/48
See application file for complete search history.

(56) References Cited

U.S. PATENT DOCUMENTS

| 2014/0153300 A1 | 6/2014 | Mori |
| 2019/0089240 A1 | 3/2019 | Hattori et al. |

(Continued)

FOREIGN PATENT DOCUMENTS

| JP | 1-153626 U | 10/1989 |
| JP | 2006-303050 A | 11/2006 |

(Continued)

OTHER PUBLICATIONS

International Search Report (PCT/ISA/210) issued in PCT Application No. PCT/JP2019/027356 dated Aug. 13, 2019 with English translation (four (4) pages).

(Continued)

*Primary Examiner* — Adolf D Berhane
(74) *Attorney, Agent, or Firm* — Crowell & Moring LLP

(57) ABSTRACT

A high voltage filter includes an anode bus bar, a cathode bus bar, a first capacitive element connected between the anode bus bar and a ground connector connected to a ground, a second capacitive element connected between the cathode bus bar and the ground connector, and a third capacitive element connected between the anode bus bar and the cathode bus bar. An anode terminal of the first capacitive element and a cathode terminal of the third capacitive element are arranged adjacent to each other, and a cathode terminal of the second capacitive element and an anode terminal of the third capacitive element are arranged adjacent to each other.

7 Claims, 4 Drawing Sheets

(51) Int. Cl.
*H02M 1/14* (2006.01)
*H02M 1/44* (2007.01)
*H02M 7/00* (2006.01)
*H02M 7/48* (2007.01)

(56) References Cited

U.S. PATENT DOCUMENTS

2020/0162051 A1* 5/2020 Taniguchi ............ H03H 7/0153
2020/0203055 A1* 6/2020 Noda ..................... H01F 27/40

FOREIGN PATENT DOCUMENTS

| | | |
|---|---|---|
| JP | 2014-110721 A | 6/2014 |
| JP | 2016-10308 A | 1/2016 |
| JP | 2017-184367 A | 10/2017 |
| JP | 2019-22355 A | 2/2019 |

OTHER PUBLICATIONS

Japanese-language Written Opinion (PCT/ISA/237) issued in PCT Application No. PCT/JP2019/027356 dated Aug. 13, 2019 (five (5) pages).

* cited by examiner

[FIG. 1]
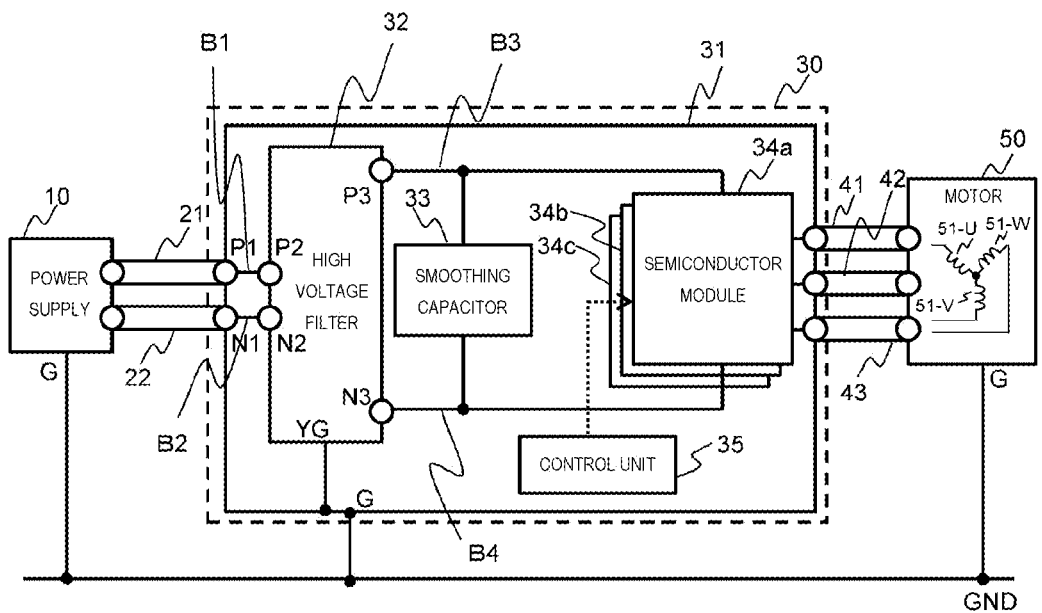

[FIG. 2]
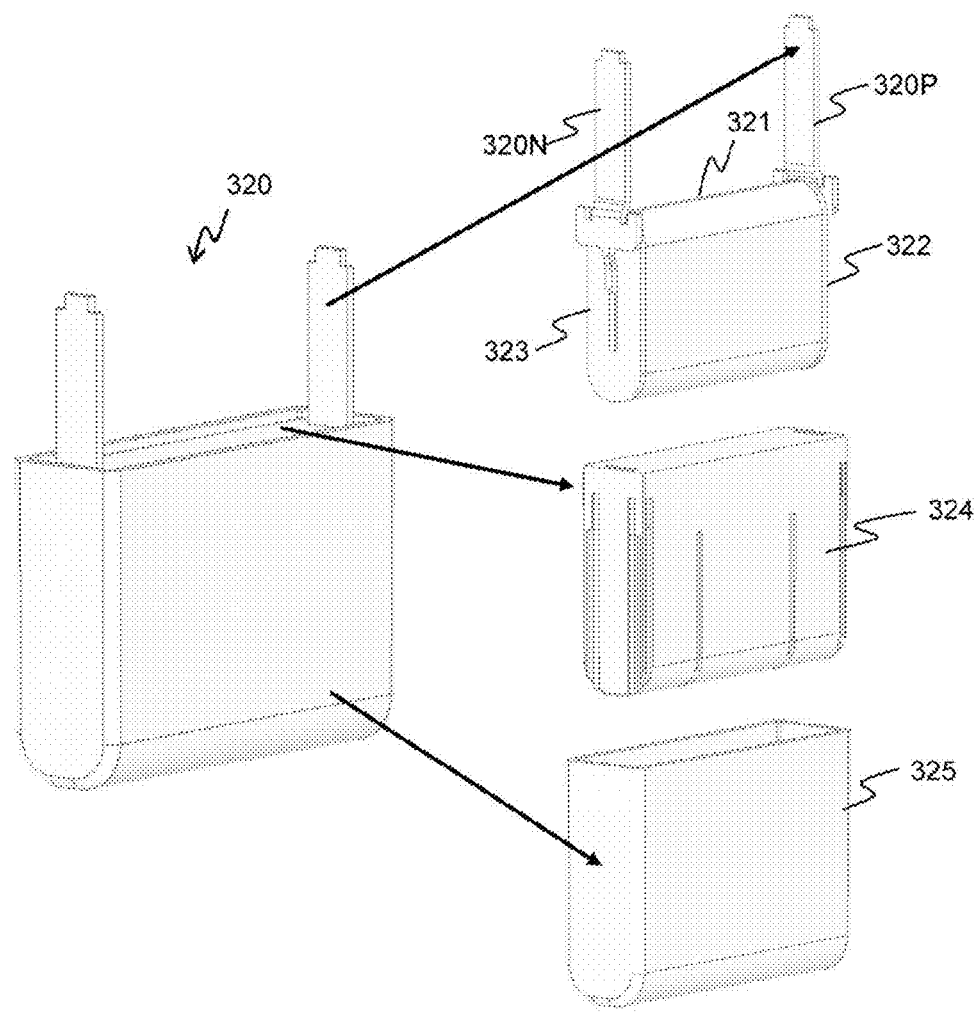

[FIG. 3]
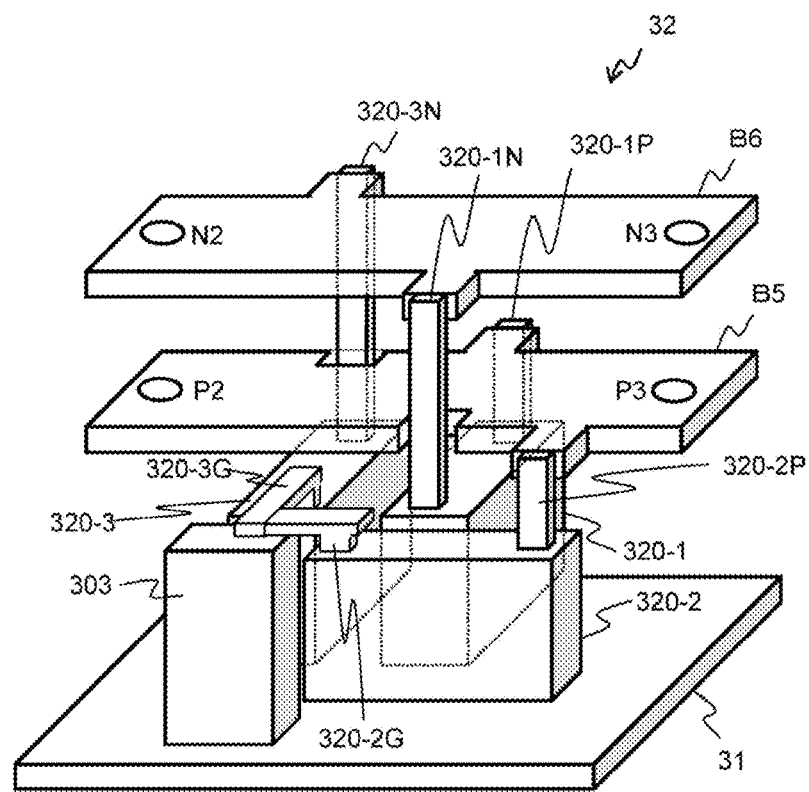

[FIG. 4]
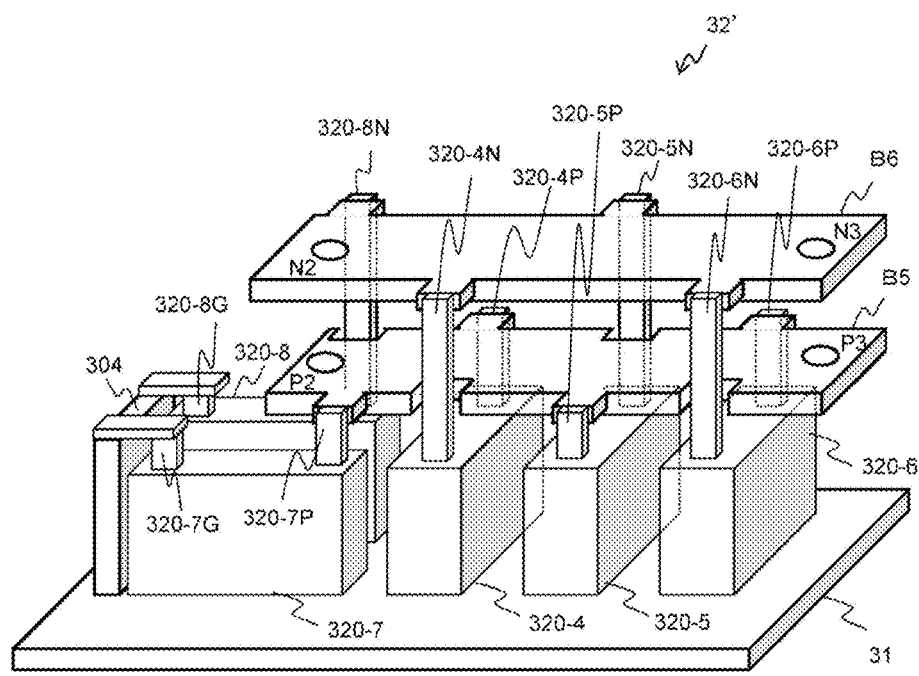

HIGH VOLTAGE FILTER AND POWER CONVERSION DEVICE

TECHNICAL FIELD

The present invention relates to a high voltage filter and a power conversion device.

BACKGROUND ART

PTL 1 describes an LC filter that prevents high-frequency noise generated by a switching operation of a power conversion device including an inverter from flowing out to a commercial power supply side.

CITATION LIST

Patent Literature

PTL 1: JP-A-2016-10308

SUMMARY OF INVENTION

Technical Problem

When the power conversion device of PTL 1 is applied to an electric vehicle, there is a problem that along with an increase in a voltage specification of a high-voltage battery, a capacity of a capacitive element inserted as a high-voltage filter is required to be large in order to increase a withstand voltage, and it is difficult to obtain desired filter performance within a limited volume of the power conversion device.

Solution to Problem

A high voltage filter according to a first aspect of the present invention includes an anode bus bar, a cathode bus bar, a first capacitive element connected between the anode bus bar and a ground connector connected to a ground, a second capacitive element connected between the cathode bus bar and the ground connector, and a third capacitive element connected between the anode bus bar and the cathode bus bar. It is preferable that an anode terminal of the first capacitive element and a cathode terminal of the third capacitive element are arranged adjacent to each other, and a cathode terminal of the second capacitive element and an anode terminal of the third capacitive element are arranged adjacent to each other.

A high voltage filter according to a second aspect of the present invention includes an anode bus bar, a cathode bus bar, a first capacitive element connected between the anode bus bar and a ground connector connected to a ground, a second capacitive element connected between the cathode bus bar and the ground connector, and a plurality of capacitive elements connected between the anode bus bar and the cathode bus bar. It is preferable that in the plurality of capacitive elements, an anode terminal, which is connected to the anode bus bar, of one of the two adjacent capacitive elements and a cathode terminal, which is connected to the cathode bus bar, of the other capacitive element are arranged adjacent to each other, the plurality of capacitive elements include a third capacitive element disposed adjacent to the first capacitive element and the second capacitive element, an anode terminal of the first capacitive element and a cathode terminal of the third capacitive element are arranged close to each other, and a cathode terminal of the second capacitive element and an anode terminal of the third capacitive element are arranged close to each other.

Advantageous Effect

According to the present invention, a filter performance of the high voltage filter can be improved and an influence of high frequency noise can be reduced without increasing capacitances of the capacitive elements.

Problems, configurations, and effects other than those described above will be clarified with reference to the description of following embodiments.

BRIEF DESCRIPTION OF DRAWINGS

FIG. 1 is a block diagram showing a configuration of a power conversion device.

FIG. 2 is an exploded view showing an example of a capacitive element used in a high voltage filter.

FIG. 3 is a diagram showing a configuration of the high voltage filter according to a first embodiment.

FIG. 4 is a diagram showing a configuration of a high voltage filter according to a second embodiment.

DESCRIPTION OF EMBODIMENTS

Hereinafter, embodiments of the present invention will be described with reference to drawings. The following descriptions and drawings are examples for explaining the present invention, and are appropriately omitted and simplified for clarification of the description. The present invention can be implemented in various other forms. Unless otherwise specified, the number of respective components may be singular or plural.

In order to facilitate understanding of the invention, positions, sizes, shapes, ranges, etc. of the respective components shown in the drawings may not represent actual positions, sizes, shapes, ranges, etc. Therefore, the present invention is not necessarily limited to the position, size, shape, range, etc. shown in the drawings.

In the drawings, the same reference numerals denote the same or corresponding parts. When there are a plurality of components having a same or similar function, different subscripts may be attached to the same reference sign. However, when it is unnecessary to distinguish the plurality of components, the subscripts may be omitted.

First Embodiment

In the present embodiment, an embodiment will be described with reference to FIGS. 1 to 3, in which a high voltage filter according to the present invention is applied to a power conversion device including an inverter for driving a motor of an electric vehicle, a hybrid vehicle, or the like.

FIG. 1 is a block diagram showing a configuration of a power conversion device 30. The power conversion device 30 includes a metal housing 31 and is configured to accommodate various circuit blocks and elements in this metal housing 31. In FIG. 1, among the circuit blocks and the elements accommodated in the metal housing 31, only those necessary for the description are illustrated. As shown in FIG. 1, a power supply 10 supplies a direct current voltage to the power conversion device 30. An electric motor 50 is driven by an alternating current voltage formed by the power conversion device 30.

The power supply 10 is a product which converts an alternating current power supply into a direct current voltage by a converter or a battery. For example, a driving inverter of a hybrid vehicle uses a high voltage battery with several hundred volts as the power supply 10. Further, for example, since a medical device such as an X-ray diagnostic device uses a commercial alternating current power supply, a product which converts the alternating current power supply into a direct current power supply by a rectifier circuit or a converter is used. An anode electrode of the power supply 10 is connected to a high voltage anode cable 21, and a cathode electrode of the power supply 10 is connected to a high voltage cathode cable 22. Although not particularly limited, a housing of the power supply 10 is set as a frame ground G and connected to a ground line GND. The high voltage anode cable 21 is connected to an input terminal (anode input terminal for power supply) P1 of the power conversion device 30, and the high voltage cathode cable 22 is electrically connected to an input terminal (cathode input terminal for power supply) N1 of the power conversion device 30.

The electric motor 50 is not particularly limited, but is configured by a three-phase electric motor. This electric motor 50 includes a rotor and a stator which are not shown, and is provided with three coils 51-U, 51-V, and 51-W in the stator. The power conversion device 30 forms a three-phase alternating current voltage and supplies the three-phase alternating current voltage to the three coils 51-U, 51-V, and 51-W via high voltage alternating current cables 41, 42, and 43. Accordingly, the three coils 51-U, 51-V, and 51-W generate a magnetic field corresponding to the three-phase alternating current voltage to make the rotor rotate. Although not particularly limited, a housing of the electric motor 50 is also set as a frame ground G and connected to the ground line GND.

Next, the configuration of the power conversion device 30 will be described. The power conversion device 30 includes a high voltage filter 32, a smoothing capacitor 33, semiconductor modules 34a to 34c, and a control unit 35 configured to control the semiconductor modules 34a to 34c. The input terminal P1 of the power conversion device 30 and an anode side input terminal P2 of the high voltage filter 32 are connected via a first bus bar B1, and the input terminal N1 of the power conversion device 30 and a cathode input terminal N2 of the high voltage filter 32 are connected via a second bus bar B2. Further, an output terminal P3 of the high voltage filter 32 and anode terminals of the semiconductor modules 34a to 34c are connected via a third bus bar B3, and an output terminal N3 of the high voltage filter 32 and cathode terminals of the semiconductor modules 34a to 34c are connected via a fourth bus bar B4. A ground connection terminal YG of the high voltage filter 32 is connected to a frame ground G of the metal housing 31. Further, the frame ground G of the metal housing 31 is connected to the ground line GND.

The semiconductor modules 34a to 34c constituting an inverter for driving the electric motor 50 generate a high-frequency switching current and voltage when switching. Therefore, the smoothing capacitor 33 configured to smooth this is generally used, and although not shown in FIG. 1, a plurality of capacitors having a capacitance of about several tens of microfarads are connected in parallel. Here, an anode side terminal of the smoothing capacitor 33 is connected to the third bus bar B3, and a cathode side terminal of the smoothing capacitor 33 is connected to the fourth bus bar B4. Each of the first bus bar B1 to the fourth bus bar B4 is a copper plate made of copper, although not particularly limited.

The semiconductor modules 34a to 34c include semiconductor elements such as IGBTs, MOSFETs, and SiC that constitute the inverter, and generate a desired voltage or current by switching (switching on and off) these semiconductor elements. Further, switching outputs of the semiconductor modules 34a to 34c are connected to the electric motor 50 via cables 41, 42, and 43, respectively. The control unit 35 controls switching operations of the semiconductor modules 34a to 34c.

In the power conversion device 30 configured as described above, according to a switch control signal from the control unit 35, the semiconductor elements in the semiconductor modules 34a to 34c are switched, and an anode voltage and a cathode voltage are periodically output to the high voltage alternating current cables 41, 42, and 43 and are periodically turned on/off. Therefore, voltages/currents in the third bus bar B3 and the fourth bus bar B4 change, and noise is generated.

Next, an example of the high voltage filter 32 mounted on the power conversion device 30 will be described with reference to FIG. 2. Here, FIG. 2 is an exploded view showing an example of a capacitive element 320 used in the high voltage filter 32. As shown in FIG. 2, the capacitive element 320 includes a dielectric material 321, and a first electrode 322 and a second electrode 323 that sandwich this dielectric material 321 from both sides to form the capacitive element 320. Further, the capacitive element includes a first connection terminal 320P connected to the first electrode 322 and used for connecting an outside of the capacitive element 320, and a second connection terminal 320N connected to the second electrode 323 and used for connecting the outside of the capacitive element 320. This dielectric material 321, the first electrode 322, and the second electrode 323 are sealed with a resin material 324. Further, the resin material 324 is covered and protected by an insulating protective case 325. As shown in FIG. 2, the first connection terminal 320P and the second connection terminal 320N are exposed to the outside. The exposed portion of the first connection terminal 320P and the second connection terminal 320N have lengths corresponding to lengths of portions buried in the protective case 325 and the resin material 324.

FIG. 3 is a diagram showing a configuration of the high voltage filter 32 according to the first embodiment. As shown in FIG. 3, the high voltage filter 32 includes a fifth bus bar (anode bus bar) B5, a sixth bus bar (cathode bus bar) B6, and a ground connector 303. The fifth bus bar B5 connects a connection point P2 with the first bus bar B1 and a connection point P3 with the third bus bar B3. The sixth bus bar B6 connects a connection point N2 with the second bus bar B2 and a connection point N3 with the fourth bus bar B4. The ground connector 303 is connected to the metal housing 31. The entire high voltage filter 32 may be further covered with a metal housing and the high voltage filter 32 may be modularized. In this case, the ground connector 303 is connected to the metal housing 31 after being connected to the metal housing covering the high voltage filter 32.

In addition, the high voltage filter 32 according to the first embodiment constitutes a filter by using two types of capacitive elements 320 having different noise reduction effects. The first type is a smoothing capacitive element 320-1 connected between the fifth bus bar B5 and the sixth bus bar B6 to suppress a differential mode noise between a high voltage anode side (third bus bar B3) and a high voltage cathode side (fourth bus bar B4). The smoothing capacitive element 320-1 is connected to the fifth bus bar B5 via an anode connection terminal 320-1P, and is connected to the sixth bus bar B6 via a cathode connection terminal 320-1N. Here, the anode connection terminal 320-1P and the cathode connection terminal 320-1N correspond to the connection terminals 320P and 320N in FIG. 2, respectively. The capacitive element 320 in such an application is also generally called an X capacitor. A capacitance of the X capacitor in the high voltage filter 32 is not particularly limited, but may be determined according to a frequency band desired to be suppressed, and different from the smoothing capacitor 33 described above, the capacitive element 320 having a capacitance of several nanofarads to several microfarads is mainly used.

The second type of the high voltage filter 32 includes a first capacitive element 320-2 connected between the fifth bus bar B5 and the ground connector 303 and a second capacitive element 320-3 connected between the sixth bus bar B6 and the ground connector 303 in order to suppress a common mode noise that is superimposed in phase on the high voltage anode side (third bus bar B3) and the high voltage cathode side (fourth bus bar B4). The first capacitive element 320-2 is connected to the fifth bus bar B5 via an anode connection terminal 320-2P, and is connected to the ground connector 303 via a ground connection terminal 320-2G. The second capacitive element 320-3 is connected to the sixth bus bar B6 via a cathode connection terminal 320-3N, and is connected to the ground connector 303 via a ground connection terminal 320-3G. The capacitive element 320 in such an application is also generally called a Y capacitor. A capacitance of the Y capacitor in the high voltage filter 32 is not particularly limited, but may be determined according to a frequency band desired to be suppressed, and a capacitive element having a capacitance of several nanofarads to several microfarads is mainly used.

In the high voltage filter 32 having such a configuration, as shown in FIG. 3, the anode connection terminal 320-1P of the smoothing capacitive element 320-1 (X capacitor) and the cathode connection terminal 320-3N of the second capacitive element 320-3 (cathode side Y capacitor) are arranged adjacent to each other, and the cathode connection terminal 320-1N of the smoothing capacitive element 320-1 (X capacitor) and the anode connection terminal 320-2P of the first capacitive element 320-2 (anode side Y capacitor) are arranged adjacent to each other. In this way, by arranging the anode connection terminal 320-2P of the Y capacitor and the cathode connection terminal 320-1N of the X capacitor adjacent to each other and arranging the cathode connection terminal 320-3N of the Y capacitor and the anode connection terminal 320-1P of the X capacitor adjacent to each other, effects of mutual inductances between connection terminals of the capacitors make it possible to reduce effective inductances of the connection terminals. In addition, by reducing the effective inductances of the connection terminals of the Y capacitors in this way, it is possible to improve filter characteristics for the common mode noise that can be reduced by the Y capacitors.

In FIG. 3, the high voltage filter 32 is disposed such that the ground connection terminal 320-2G of the first capacitive element 320-2 and the ground connection terminal 320-3G of the second capacitive element 320-3 are arranged adjacent to each other. According to this arrangement, the two ground connection terminals 320-2G and 320-3G can be connected to the same ground connector 303. Therefore, by sharing an impedance from the anode connection terminal 320-2P of the Y capacitor to a ground of the metal housing 31 and an impedance from the cathode connection terminal 320-3N of the Y capacitor to the ground of the metal housing 31, it is possible to efficiently reduce the common mode noise.

Second Embodiment

In the present embodiment, an embodiment will be described with reference to FIG. 4, in which a high voltage filter according to the present invention is applied to a power conversion device including an inverter for driving a motor of an electric vehicle, a hybrid vehicle, or the like. The block diagram showing the configuration of the power conversion device shown in FIG. 1 and the exploded view showing the example of the capacitive element used in the high voltage filter shown in FIG. 2 are the same as those of the first embodiment, and thus, the illustrations thereof will be omitted.

FIG. 4 is a diagram showing a configuration of a high voltage filter 32' according to the present embodiment. In the present embodiment, regarding the X capacitor connected between the fifth bus bar B5 and the sixth bus bar B6, it is assumed that it becomes necessary to divide capacitances due to limitations of volumes of capacitive elements along with an increase in a voltage of the power supply 10.

As shown in FIG. 4, the high voltage filter 32' includes the fifth bus bar (anode bus bar) B5, the sixth bus bar (cathode bus bar) B6, and a ground connector 304. The fifth bus bar B5 connects a connection point P2 with the first bus bar B1 and a connection point P3 with the third bus bar B3. The sixth bus bar B6 connects a connection point N2 with the second bus bar B2 and a connection point N3 with the fourth bus bar B4. The ground connector 304 is connected to the metal housing 31. The entire high voltage filter 32' may be covered with a metal housing and the high voltage filter 32' may be modularized. In this case, the ground connector 304 is connected to the metal housing 31 after being connected to the metal housing covering the high voltage filter 32'.

In the high voltage filter 32' according to the second embodiment, in order to suppress the differential mode noise between the high voltage anode side (third bus bar B3) and the high voltage cathode side (fourth bus bar B4), smoothing capacitive elements 320-4, 320-5, and 320-6 are connected between the fifth bus bar B5 and the sixth bus bar B6 by arranging an anode connection terminal and a cathode connection terminal of the smoothing capacitive elements adjacent to each other. That is, the smoothing capacitive element 320-4 is connected to the fifth bus bar B5 via an anode connection terminal 320-4P, and is connected to the sixth bus bar B6 via a cathode connection terminal 320-4N. The smoothing capacitive element 320-5 is connected to the fifth bus bar B5 via an anode connection terminal 320-5P, and is connected to the sixth bus bar B6 via a cathode connection terminal 320-5N. Further, the smoothing capacitive element 320-6 is connected to the fifth bus bar B5 via an anode connection terminal 320-6P, and is connected to the sixth bus bar B6 via a cathode connection terminal 320-6N. The capacitive element 320 in such an application is also generally called an X capacitor. A capacitance of the X capacitor in the high voltage filter 32' is not particularly limited, but may be determined according to a frequency band desired to be suppressed, and different from the smoothing capacitor 33 described above, a capacitive element which has a capacitance of several nanofarads to several microfarads is mainly used.

Further, in order to suppress a common mode noise that is superimposed in phase on the high voltage anode side (third bus bar B3) and the high voltage cathode side (fourth bus bar B4), a first capacitive element 320-7 is connected between the fifth bus bar B5 and the ground connector 304, and a second capacitive element 320-8 is connected between the sixth bus bar B6 and the ground connector 304. The first capacitive element 320-7 is connected to the fifth bus bar B5 via an anode connection terminal 320-7P, and is connected to the ground connector 304 via a ground connection terminal 320-7G. Further, the second capacitive element 320-8 is connected to the sixth bus bar B6 via a cathode connection terminal 320-8N, and is connected to the ground connector 304 via a ground connection terminal 320-8G. The capacitive element in such an application is also generally called a Y capacitor. A capacitance of the Y capacitor in the high voltage filter 32' is not particularly limited, but may be determined according to a frequency band desired to be suppressed, and a capacitive element which has a capacitance of several nanofarads to several microfarads is mainly used.

In the high voltage filter 32' having such a configuration, as shown in FIG. 4, the anode connection terminal 320-4P of the smoothing capacitive element 320-4 (X capacitor) and the cathode connection terminal 320-8N of the second capacitive element 320-8 (cathode side Y capacitor) are arranged adjacent to each other, and the cathode connection terminal 320-4N of the smoothing capacitive element 320-4 (X capacitor) and the anode connection terminal 320-7P of the first capacitive element 320-7 (anode side Y capacitor) are arranged adjacent to each other. In this way, by arranging the anode connection terminal 320-7P of the Y capacitor and the cathode connection terminal 320-4N of the X capacitor adjacent to each other and arranging the cathode connection terminal 320-8N of the Y capacitor and the anode connection terminal 320-4P of the X capacitor adjacent to each other, effects of mutual inductances between connection terminals of the capacitors make it possible to reduce effective inductances of the connection terminals. In addition, by reducing the effective inductances of the connection terminals of the Y capacitors in this way, it is possible to improve filter characteristics for the common mode noise that can be reduced by the Y capacitors.

In FIG. 4, the high voltage filter 32' is disposed such that the anode connection terminal 320-4P of the smoothing capacitive element 320-4 and the cathode connection terminal 320-5N of the smoothing capacitive element 320-5 are arranged adjacent to each other. The cathode connection terminal 320-4N of the smoothing capacitive element 320-4 and the anode connection terminal 320-5P of the smoothing capacitive element 320-5 are arranged adjacent to each other. The anode connection terminal 320-5P of the smoothing capacitive element 320-5 and the cathode connection terminal 320-6N of the smoothing capacitive element 320-6 are arranged adjacent to each other. Further, the cathode connection terminal 320-5N of the smoothing capacitive element 320-5 and the anode connection terminal 320-6P of the smoothing capacitive element 320-6 are arranged adjacent to each other. In this way, by arranging the anode connection terminals and the cathode connection terminals of a plurality of X capacitors adjacent to each other, effects of mutual inductances between connection terminals of the capacitors make it possible to reduce effective inductances of the connection terminals. In addition, by reducing the effective inductances of the connection terminals of the X capacitors in this way, it is possible to improve filter characteristics for the differential mode noise that can be reduced by the X capacitors.

In FIG. 4, the high voltage filter 32' is disposed such that the ground connection terminal 320-7G of the first capacitive element 320-7 and the ground connection terminal 320-8G of the second capacitive element 320-8 are arranged adjacent to each other. According to this arrangement, the two ground connection terminals 320-7G and 320-8G can be connected to the same ground connector 304. Therefore, by sharing an impedance from the anode connection terminals of the Y capacitors to the ground of the metal housing 31 and an impedance from the cathode connection terminals of the Y capacitors to the ground of the metal housing 31, it is possible to efficiently reduce the common mode noise.

The second embodiment describes an example in which three smoothing capacitive elements 320-4, 320-5, and 320-6 are connected between the fifth bus bar B5 and the sixth bus bar B6 by arranging an anode connection terminal and a cathode connection terminal of the adjacent smoothing capacitive elements adjacent to each other. However, the number of the smoothing capacitance elements is not limited to three, and a plurality of smoothing capacitance elements may be provided. Also in this case, the smoothing capacitance elements are connected by arranging an anode connection terminal and a cathode connection terminal of the adjacent smoothing capacitance elements adjacent to each other.

According to the embodiments described above, the following operational effects are obtained.

(1) The high voltage filter 32 includes the anode bus bar B5, the cathode bus bar B6, the first capacitive element 320-2 connected between the anode bus bar B5 and the ground connector 303 that is connected to the ground, the second capacitive element 320-3 connected between the cathode bus bar B6 and the ground connector 303, and the smoothing capacitive element 320-1 connected between the anode bus bar B5 and the cathode bus bar B6. The anode terminal 320-2P of the first capacitive element 320-2 and the cathode terminal 320-1N of the smoothing capacitive element 320-1 are arranged adjacent to each other, and the cathode terminal 320-3N of the second capacitive element 320-3 and the anode terminal 320-1P of the smoothing capacitive element 320-1 are arranged adjacent to each other. Accordingly, a filter performance of the high voltage filter can be improved and an influence of the high frequency noise can be reduced without increasing capacitances of capacitive elements.

(2) The high voltage filter 32' includes the anode bus bar B5, the cathode bus bar B6, the first capacitive element 320-7 connected between the anode bus bar B5 and the ground connector 304 that is connected to the ground, the second capacitive element 320-8 connected between the cathode bus bar B6 and the ground connector 304, and the plurality of capacitive elements (smoothing capacitive elements 320-4, 320-5, and 320-6) connected between the anode bus bar B5 and the cathode bus bar B6. In the plurality of capacitive elements (smoothing capacitive elements 320-4, 320-5, and 320-6), the anode terminal, which is connected to the anode bus bar B5, of one of the two adjacent capacitive elements and the cathode terminal, which is connected to the cathode bus bar B6, of the other capacitive element are arranged adjacent to each other, and the plurality of capacitive elements include the smoothing capacitive element 320-4 disposed adjacent to the first capacitive element 320-7 and the second capacitive element 320-8, the anode terminal 320-7P of the first capacitive element 320-7 and the cathode terminal 320-4N of the smoothing capacitive element 320-4 are arranged close to each other, and the cathode terminal 320-8N of the second capacitive element 320-8 and the anode terminal 320-4P of the smoothing capacitive element 320-4 are arranged close to each other. Accordingly, a filter performance of the high voltage filter can be improved and an influence of high frequency noise can be reduced without increasing capacitance of capacitive elements.

The present invention is not limited to the embodiments described above, and other embodiments conceivable within the range of the technical idea of the present invention are also included in the scope of the present invention as long as the features of the present invention are not impaired.

A disclosed content of the following priority basic application is incorporated herein as a reference.

Japanese Patent Application No. 2018-179490 (Sep. 25, 2018)

REFERENCE SIGN LIST

10: power supply
21: high voltage anode cable
22: high voltage cathode cable
30: power conversion device
31: metal housing
32, 32': high voltage filter
33: smoothing capacitor
34a, 34b, 34c: semiconductor module
35: control unit
41, 42, 43: high voltage alternating current cable
50: electric motor
51-U, 51-V, 51-W: coil
B1 to B6: first bus bar to sixth bus bar
303, 304: ground connector
320: capacitive element
320-1, 320-4, 320-5, 320-6: smoothing capacitive element
320-2, 320-7: first capacitive element
320-3, 320-8: second capacitive element
321: dielectric material
322: first electrode
323: second electrode
320P: first connection terminal
320N: second connection terminal
324: resin material
325: protective case

The invention claimed is:

1. A high voltage filter, comprising:
an anode bus bar;
a cathode bus bar;
a first capacitive element connected between the anode bus bar and a ground connector connected to a ground;
a second capacitive element connected between the cathode bus bar and the ground connector; and
a third capacitive element connected between the anode bus bar and the cathode bus bar, wherein
an anode terminal of the first capacitive element and a cathode terminal of the third capacitive element are arranged adjacent to each other, and
a cathode terminal of the second capacitive element and an anode terminal of the third capacitive element are arranged adjacent to each other.

2. The high voltage filter according to claim 1, wherein a ground connection terminal connected to the ground connector of the first capacitive element and a ground connection terminal connected to the ground connector of the second capacitive element are arranged adjacent to each other.

3. A power conversion device, comprising:
the high voltage filter according to claim 1;
a semiconductor module constituting an inverter; and
a control unit configured to control a switching operation of the semiconductor module.

4. The power conversion device according to claim 3, further comprising:
a metal housing accommodating the high voltage filter, the semiconductor module, and the control unit, and
the ground connector is connected to the metal housing.

5. A high voltage filter, comprising:
an anode bus bar;
a cathode bus bar;
a first capacitive element connected between the anode bus bar and a ground connector connected to a ground;
a second capacitive element connected between the cathode bus bar and the ground connector; and
a plurality of capacitive elements connected between the anode bus bar and the cathode bus bar, wherein
in the plurality of capacitive elements, an anode terminal, which is connected to the anode bus bar, of one of the two adjacent capacitive elements and a cathode terminal, which is connected to the cathode bus bar, of the other capacitive element are arranged adjacent to each other,
the plurality of capacitive elements include a third capacitive element disposed adjacent to the first capacitive element and the second capacitive element,
an anode terminal of the first capacitive element and a cathode terminal of the third capacitive element are arranged close to each other, and
a cathode terminal of the second capacitive element and an anode terminal of the third capacitive element are arranged close to each other.

6. The high voltage filter according to claim 5, wherein the plurality of capacitive elements include the third capacitive element, a fourth capacitive element, and a fifth capacitive element.

7. The high voltage filter according to claim 5, or wherein a ground connection terminal connected to the ground connector of the first capacitive element and a ground connection terminal connected to the ground connector of the second capacitive element are arranged adjacent to each other.

* * * * *